United States Patent
Laor et al.

(10) Patent No.: US 9,363,173 B2
(45) Date of Patent: Jun. 7, 2016

(54) ROUTER AND SWITCH ARCHITECTURE

(75) Inventors: Michael Laor, Zichron Yaakov (IL); Eyal Oren, Kfar Hess (IL); Vladimir Miliavsky, Petach Tikva (IL)

(73) Assignee: Compass Electro Optical Systems Ltd., Netanya (IL)

( * ) Notice: Subject to any disclaimer, the term of this patent is extended or adjusted under 35 U.S.C. 154(b) by 0 days.

(21) Appl. No.: 13/281,940

(22) Filed: Oct. 26, 2011

(65) Prior Publication Data

US 2012/0106562 A1     May 3, 2012

Related U.S. Application Data

(60) Provisional application No. 61/407,461, filed on Oct. 28, 2010.

(51) Int. Cl.
*H04L 12/28* (2006.01)
*H04L 12/773* (2013.01)
*H04L 12/933* (2013.01)
*H04L 12/935* (2013.01)

(52) U.S. Cl.
CPC ............... *H04L 45/60* (2013.01); *H04L 49/10* (2013.01); *H04L 49/3009* (2013.01)

(58) Field of Classification Search
CPC . H04J 14/0223; G02B 6/4246; G02B 6/4214; G02B 6/4249; G02B 6/43; G02B 6/4204; G02B 6/4212; H01S 5/183; H01S 5/0262; H01S 5/0264; H04Q 11/0005
USPC ............ 370/401; 398/66, 164, 89, 1, 141, 52; 455/313; 385/14, 24; 359/139, 108
See application file for complete search history.

(56) References Cited

U.S. PATENT DOCUMENTS

| | | | | |
|---|---|---|---|---|
| 5,446,572 A | * | 8/1995 | Husbands et al. | ............... 398/89 |
| 6,016,211 A | * | 1/2000 | Szymanski | .............. G02B 6/43 |
| | | | | 359/108 |
| 7,702,191 B1 | * | 4/2010 | Geron et al. | .................... 385/14 |
| 2002/0067882 A1 | * | 6/2002 | Guilfoyle | ................. G02B 6/43 |
| | | | | 385/24 |

(Continued)

FOREIGN PATENT DOCUMENTS

| | | |
|---|---|---|
| CN | 101098238 A | 1/2008 |
| CN | 101335685 A | 12/2008 |

(Continued)

OTHER PUBLICATIONS

International Search Report and Written Opinion mailed on Jan. 30, 2012, for International application No. PCT/US2011/057821, filed Oct. 26, 2011(13 pages).

(Continued)

*Primary Examiner* — Dang Ton
*Assistant Examiner* — Lionel Preval
(74) *Attorney, Agent, or Firm* — Wilmer Cutler Pickering Hale and Dorr LLP (57) ABSTRACT

A packet switching system for a packet transfer network, the system having an architecture including a plurality of line cards, each including an ingress path pipeline, with processing elements, and an egress buffer, and an electro-optical In/Out (IO) interconnect coupling the line cards to one another in a full mesh connectivity, in the absence of a switch fabric, wherein the ingress path pipeline of each line card is coupled by means of the electro-optical IO interconnect to the egress buffer of each of the plurality of line cards.

12 Claims, 4 Drawing Sheets

(56) References Cited

U.S. PATENT DOCUMENTS

| | | | |
|---|---|---|---|
| 2003/0081287 A1* | 5/2003 | Jannson | H04Q 11/0005 398/52 |
| 2003/0202510 A1 | 10/2003 | Witkowski et al. | |
| 2004/0042448 A1 | 3/2004 | Lebizay et al. | |
| 2005/0047795 A1* | 3/2005 | Windover et al. | 398/164 |
| 2006/0018329 A1* | 1/2006 | Nielsen et al. | 370/401 |
| 2006/0114907 A1 | 6/2006 | Wu | |
| 2007/0183415 A1 | 8/2007 | Fischer et al. | |
| 2008/0008471 A1* | 1/2008 | Dress | G06E 3/006 398/66 |
| 2010/0003029 A1* | 1/2010 | Dress et al. | 398/66 |
| 2010/0119236 A1* | 5/2010 | Uno et al. | 398/141 |
| 2012/0046008 A1* | 2/2012 | Petrovic et al. | 455/313 |

FOREIGN PATENT DOCUMENTS

| | | |
|---|---|---|
| JP | 2004-512547 A | 4/2004 |
| JP | 2005-223882 A | 8/2005 |
| JP | 2006-215815 A | 8/2006 |
| WO | WO-2006/020232 A1 | 2/2006 |
| WO | WO-2006/054703 A1 | 5/2006 |
| WO | WO-2006/077961 A1 | 7/2006 |

OTHER PUBLICATIONS

Japanese Office Action issued by the Japan Patent Office for Application No. 2013-536770 dated May 29, 2015 (4 pages).

Chinese Office Action issued by the State Intellectual Property Office of the People's Republic of China for Chinese Application No. 201180058495.8 dated Mar. 24, 2015 (38 pages).

* cited by examiner

FIGURE 1

PRIOR ART

ROUTER AND SWITCH ARCHITECTURE

CROSS-REFERENCE TO RELATED APPLICATIONS

The present invention claims priority under 35 U.S.C. §119 (e) to U.S. Provisional Application No. 61/407,461 filed on Oct. 28, 2010, entitled "Router and Switch Architecture," incorporated herein by reference in its entirety.

FIELD OF THE INVENTION

The present invention relates to router and switch architecture, in general and, in particular, to a high end router and a packet switching system using a full mesh connectivity architecture.

BACKGROUND OF THE INVENTION

Figure 1:
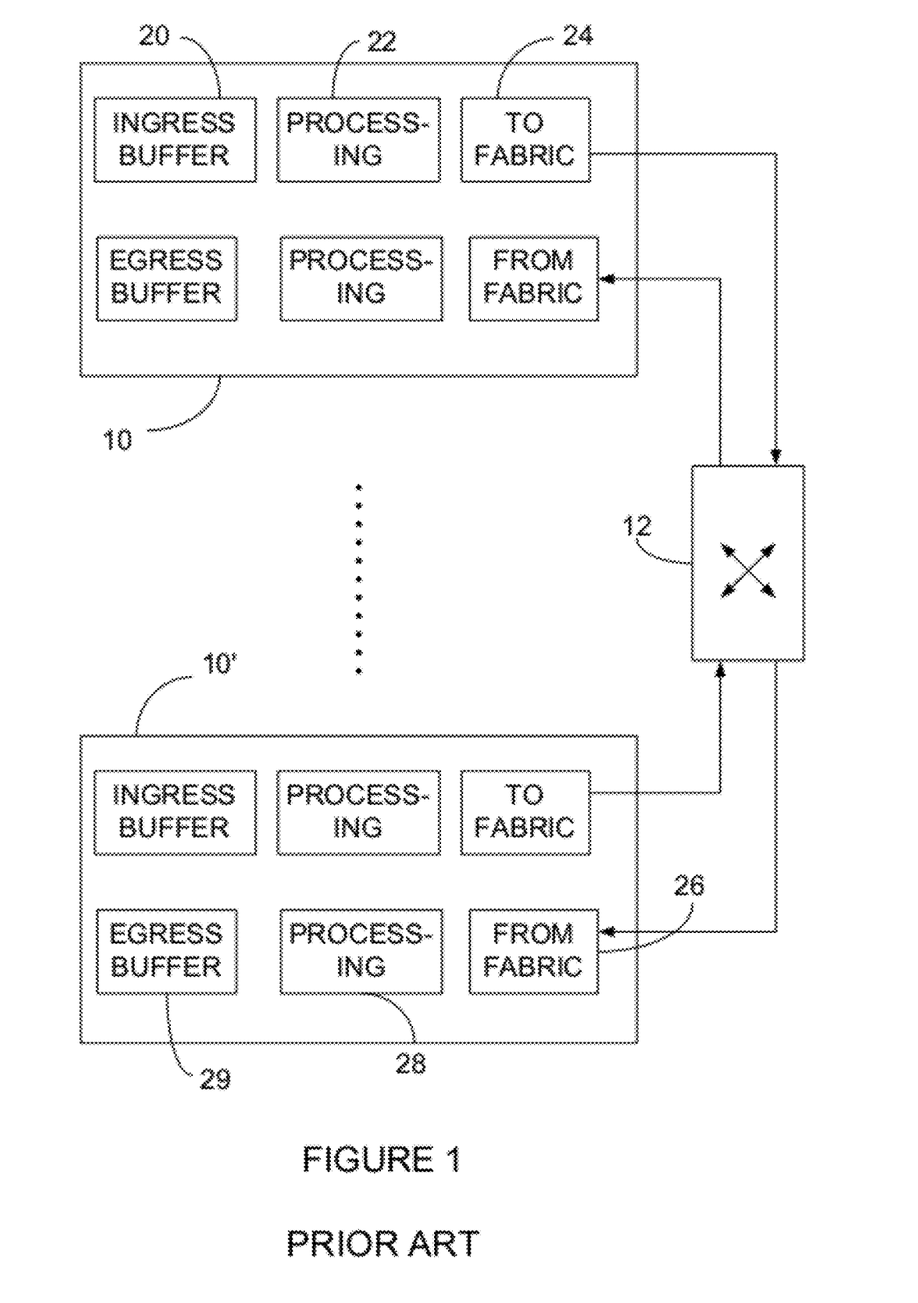
FIG. 1 is a schematic illustration of a prior art switch architecture.

The high speed routers and data switching systems share a fundamental architectural structure in the way they are built, perform their operations and handle the data that is going through the system. FIG. 1 describes a generic architecture for such a high speed data switching system. While different systems may vary in implementation, most of the fundamental elements that are described below can be found in all systems, albeit each with its own unique implementation flavor.

The following is a description of the main elements of a generic system (referring to FIG. 1). High speed routers and data communication switching systems are composed of a set of N line cards 10. Each of the line cards interfaces to the data network (not shown) for receiving and sending information to and from the network. In a typical packet switching network, the basic information element is a packet and, hence, each line card receives packets from the network and sends packets to the network. All the line cards in a given system are connected to each other via an internal interconnect 12. The common way to implement such an interconnect in a high speed system which handles a lot of bandwidth is a switch fabric that allows sending of information from a set of line cards 10, acting as source line cards, to a set of line cards 10', acting as destination line cards, in the most efficient way.

As a packet arrives to the line card 10 from the network, it is absorbed by an input buffer 20 and then handed to a set of elements 22 that perform various kinds of processing and handling of the packet. In a typical router, this includes elements for processing of the layer 2 headers (e.g., processing of the Ethernet header, in case the interface is Ethernet), and a network processor in the card, e.g., of EZchip Semiconductor, Ltd. Of Yokneam, Israel, that performs the destination resolution (based on any of IP address look up, MPLS label look up, and ACL based forwarding using any other field in the packet header, as well any combination of fields), which leads to a decision to which line card the packet should be sent. In addition, any ingress features that were configured are applied at this stage. Some examples of such features are filtering, policing, statistics updates, header fields updates, such as TOS/EXP, TTL, etc., or searches in other fields of the packet, all as per the specific configuration. After all the required operations are completed, the packet, whose destination egress path is now known, is handed to the line card switch fabric interface 24 and is held in a buffer until its turn comes to be sent over the switch fabric (interconnect) 12 to the destination line card.

There are many different types of switch fabric architectures. All implement an efficient interconnect between N line cards, where each line card may need to send information to any of the other N line cards either in unicast or multicast, and the switch fabric algorithm optimizes the usage of the interconnect. This implies, of course, that the switch fabric is a congestion point, since if, for example, at a given point in time, all the line cards need to send packets to the same subset of line cards, some of the packets will have to wait for their turn, since the switch fabric interconnected is shared. The role of the switch fabric is to look at all the offered load across all of the line cards and optimize the sending of traffic among all the line cards at any point. Clearly, it may be the case that some packets will need to wait till their turn comes before being sent to the destination line card. Hence, buffering at the ingress is required and is common across all the systems that implement switch fabrics. This buffer is usually arranged into multiple queues, each getting different handling, so that differentiation between the different types of traffic can be made. For example, allowing traffic that is more sensitive to a delay to be sent first.

As the packet traverses the switch fabric and arrives to the destination line card 10' through which it will egress the system, it is placed in a buffer 26 that is receiving the information from the switch fabric 12. From there, it is handed to a set of processing elements 28 that handle the outgoing traffic. These may include a network processor that may apply any feature that was configured to be applied at this egress path for this particular type of packet. Examples of such features are policing the outgoing traffic rate, applying filtering for various security measures, updating various statistics, and others. Next, the packet is processed for a layer 2 header and then handed over to the egress buffer 29 before it is sent out. The egress buffer 29 is the place where differentiation among different types of data and destinations can be made, so that the router can provide the service level that is required for each type of traffic. For instance, if there are several customers connected to a line card and some have bought and paid for more bandwidth than others, we need to prioritize their traffic ahead of low paying customers' traffic. Hence, in the egress buffer there usually is a queuing system that can queue packets, giving each type of data different handling by way of priority, shaping, amount of BW, etc. This egress queuing is in addition to the ingress queuing which is required due to the switch fabric congestion. This architecture is called combined input-output queuing and is typical of most high speed switch fabric based systems.

Combined input-output queuing architecture, while efficient, is limited in its ability to scale to a very high bandwidth of its various line cards. This results from the need for a high speed up. When packets from multiple inputs are destined toward a certain output, ideally one would want to send all the arriving information to that output as soon as it is ready to be sent. At the output, one can then observe all of the offered load at any given point in time. This allows prioritizing the traffic based on the actual offered load and delivering Quality of Service accurately in which some of the packets streams may be discriminated relative to other higher priority streams. However, in order to achieve that, one needs to be able to receive information simultaneously at the output from all the inputs in order to cater for the extreme case in which all the inputs want to send packets to the same output during the same window of time. This, in turn, requires a very high bandwidth into the receiving element at the output side. This amount of bandwidth is typically measured as a multiple of the line card output speed and is called speed up. Hence, if we have N line cards, all sending to a certain line card, all are of the same speed. Then, if that output card can absorb the information from all the inputs simultaneously, it is said that it has a speed up of N.

When the line card bandwidth is very high, achieving a speed up of N is not practical, since it is not practical to receive more than a certain amount of information into a traffic manager ASIC or into a memory, which are the typical receiving devices in the output side. Hence, a compromise is deployed in which a slower speed up, commonly of 2 or 3, is implemented. As a result, in certain temporary cases in which more than 2 or 3 inputs must send information to the same output, some of the information will have to be buffered in the inputs, as no more than 2 or 3 (depending on the implemented speed up) streams can be sent simultaneously. Hence, a combined input-output queuing architecture results. While this approach provides a reasonably efficient solution, it poses a challenge when the bandwidth of the line card further increases. In this case, achieving even a speed up of 2 may become a challenge for the same reasons mentioned above—technical difficulty in receiving very high bandwidth into an ASIC or a memory device. As a result, the amount of packets that are accumulated in the input queues will increase, which, in turn, will increase the overall delay of packets in the system. If, among those packets, there are streams that require low delay due to the nature of the traffic they carry, those streams may not receive the desired handling. This accumulation in the input queues causes further inaccuracy in delivering the required Quality of Service for the overall traffic streams, since the output can now observe only a smaller fraction of the traffic, as most of it is queued in the inputs. As a result, the decision which packets stream to send and which to delay is not optimal. Furthermore, since each input operates independently and has no information on the available offered load at other inputs, none can make the most optimal decision across all of the traffic. Lastly, both the switch fabric and the input buffers can overflow, which leads to packets drop, which is not optimal. The result is that, instead of observing the offered load and making the most optimal decision, the decision of which traffic to send is divided across multiple nodes, each operating independently, and is based on partial information. The more the bandwidth of each line card increases, the more this challenge manifests itself. Hence, an input-output architecture presents a bandwidth scalability challenge.

Additionally, even for bandwidth in which a good enough speed up can be achieved, the input-output queuing architecture presents a configuration challenge. This is the case since, in order to achieve a certain desired behavior of discrimination among the outgoing packet streams of a certain output, one must configure the priorities and behavior of streams in the output, as well as in all the inputs, since queues can build up in any input toward a certain output. This makes the configuration more complex.

Accordingly, there is a long felt need for a packet switching system that could move all the input streams to the output without queuing at the input, irrespective of the line card speed, hence achieving a speed up of N. This will allow performing configuration at the output line card only, leading to a simpler configuration, more accurate Quality of Service behavior and a smaller system, as it will also allow removal of the associated input buffers. It would also be desirable if one could continue and scale the bandwidth speed of a line card upward without degrading traffic behavior.

SUMMARY OF THE INVENTION

The present invention relates to a switch and router architecture for a packet switching system using an electro-optical full mesh of N elements with a speed up of N. A speed up of N means the ability to absorb N-times the bandwidth by which a line card is connected to the network. This is accomplished by coupling the input of each line card to the output of every other line card in the network via an electro-optical in out (IO) interconnect, whereby after the packet completes the ingress processing, the packet is held in the ingress line card for partial egress processing, so that both the ingress and partial egress processing are performed in the ingress side, using the same set of processing elements and performing all the required egress features, as configured. The packet is then sent along a congestion free electro-optical path to the egress, where the rest of the egress processing is performed. This congestion free path from each ingress to each egress exists permanently and simultaneously regardless of the type of traffic arriving to the ingress. This structure and method provide full mesh connectivity which allows very high speed IO.

There is thus provided, according to one embodiment of the invention, a packet switching system for a packet transfer network, the system having an architecture including a plurality of line cards, each including an ingress path pipeline, with processing elements, and an egress buffer, and an electro-optical In/Out (IO) interconnect coupling the line cards to one another in a full mesh connectivity, in the absence of a switch fabric, wherein the ingress path pipeline of each line card is coupled by means of the electro-optical IO interconnect to the egress buffer of each of the plurality of line cards.

According to one embodiment, the electro-optical IO interconnect includes a plurality of integrated circuit chips, each having a plurality of light sources to transfer processed data from an ingress path pipeline on one of the line cards to an egress buffer on another of the line cards via a plurality of photo detectors on the electro-optical IO interconnect.

According to further embodiments of the invention, the electro-optical IO interconnect includes a CMOS chip with logic circuitry coupled to a matrix of vertical-cavity surface-emitting lasers (VCSELs) and to a matrix of Photo Detectors (PDs), wherein the CMOS circuitry includes interface circuitry interfacing between digital circuitry on the CMOS chip and the VCSELs, and interface circuitry interfacing between the photo detectors and the CMOS chip logic circuitry.

There is also provided, according to the present invention, a method of creating a packet switching network including providing a plurality of line cards in the network and connecting an ingress path pipeline in each of the plurality of line cards to an egress buffer in each of the plurality of line cards by an electro-optical In/Out (IO) interconnect in full mesh connectivity for data switching.

According to preferred embodiments of the invention, the method further includes forming the electro-optical IO interconnect by coupling an integrated circuit to a light source and to a light detector and coupling interface circuitry between the light source and the integrated circuit and between the light detector and the integrated circuit.

There is also provided, according to the present invention, a method of packet switching through a packet switching network including receiving a packet in an ingress path pipeline in a first line card, performing ingress processing and partial egress processing in the ingress path pipeline, including determining a destination address of the packet, transferring the processed packet to an egress buffer on a second line card via an electro-optical In/Out (IO) interconnect connecting each line card in the network to an egress buffer on each line card in the network in full mesh connectivity and performing additional egress processing in the egress buffer on the second line card.

According to preferred embodiments, the step of performing ingress processing includes attaching an internal data structure to the packet indicating additional processing required in the egress and the step of performing additional egress processing includes performing the additional processing indicated in the internal data structure.

According to further embodiments, the step of transferring is performed at a speed of up to N at each end of the mesh connectivity. Preferably, the step of transferring is performed at a speed of up to N (a multiple of the line card output speed) at each end of the mesh connectivity using an electro-optical full mesh of n elements.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to an innovative switching architecture for a packet switching system. The following is a description of the architecture of the innovative switching system which can perform better than conventional architectures and requires fewer hardware components. This, in turn, leads to a significant reduction in the system cost and power consumption. This is accomplished by utilizing an electro-optical In/Out (IO) interconnect between the various line cards, instead of a switch fabric. According to embodiments of the invention, an innovative electro-optical IO technology, described in detail below, is deployed in a way which enables implementation of this innovative architecture. The electro-optical IO interconnect provides for a significant, dramatic increase of the amount of information that can be sent in and out of a standard logic integrated circuit (IC).

Figure 2:
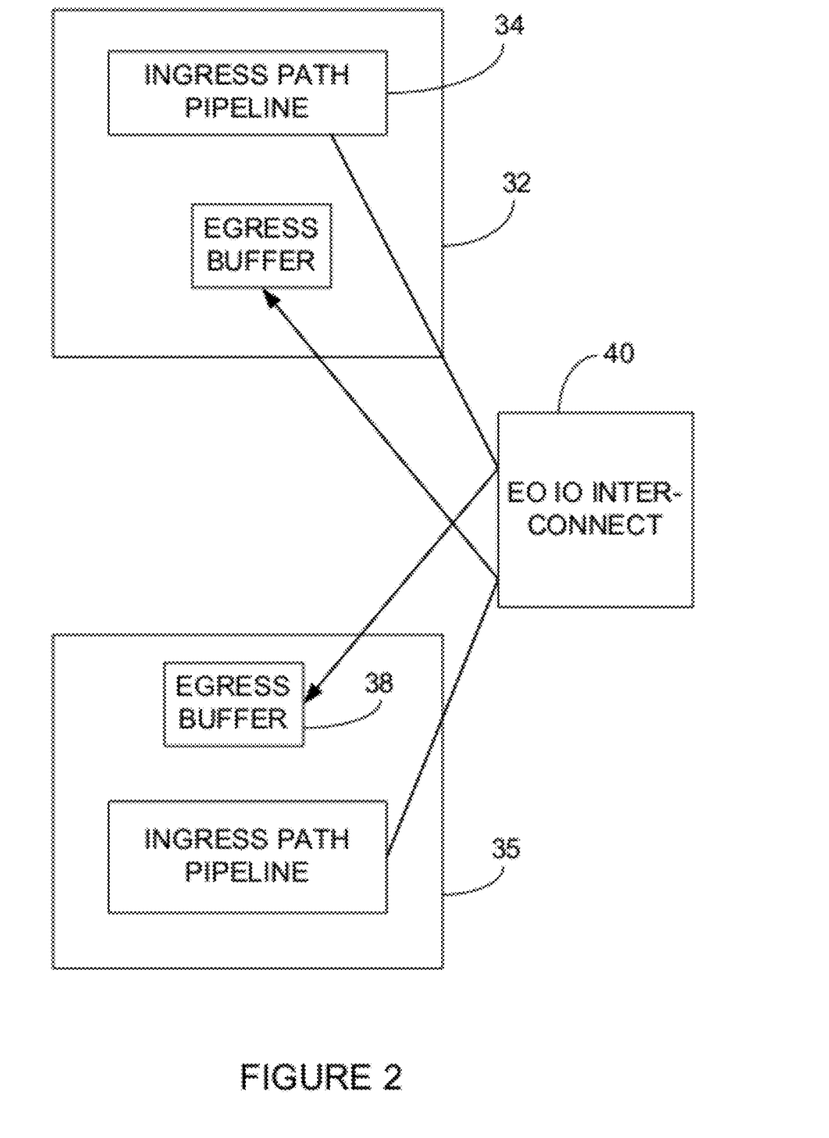
FIG. 2 is a schematic illustration of a router and switch architecture constructed and operative in accordance with one embodiment of the present invention.

Referring now to FIG. 2, the novel architecture for a switching system 30, according to one embodiment of the invention, will be described. As packets arrive at the line card or interface card 32 from the network (not shown), they are absorbed into the ingress path packets pipeline 34, which includes a set of software and/or hardware elements for performing various processing and handling steps. These steps include processing of the layer 2 headers (e.g., processing of the Ethernet header, in case the interface is Ethernet). Also, ingress path pipeline 34 may include a network processor, which performs the destination look up, and which determines to which line card the packet should be sent. Furthermore, any feature that was configured at the source is applied to the packets by this network processor.

However, as opposed to the prior art case described above, according to the present architecture of the switching system, after the packet completes the ingress processing, the packet is held in the ingress line card for partial egress processing, as well. It is a particular feature of the present invention that the egress processing is performed partially in the ingress side (e.g., classification and identification of the egress destination address), and partially in the egress side (e.g., queuing, shaping, policing). Preferably, an internal data structure is attached to the data during ingress processing, including an internal header carrying internal information regarding the required processing at the egress, if any. A further particular feature of the invention is that, once the egress destination is identified in the ingress side, a congestion free path exists directly from the ingress to the particular egress, irrespective of the offered load throughout the system. This can be done since, after completing the ingress processing and identifying the destination egress along with the destination egress queues, and any required egress operation (e.g. policers that should be applied in the egress) using the electro-optical interconnect, enough bandwidth can be provided from any ingress to any egress, implementing a congestion free path. An additional portion of the egress processing can be completed at the ingress side since, after the destination has been determined, the egress configuration can be looked up and the required features, if any at all, can be further applied to the packet. As the egress processing in the ingress line card is completed, the packet is sent to the egress buffer 38 of the destination line card 35, where the rest of the egress processing is performed. Accordingly, this novel architecture of a switching system requires no switch fabric. Rather, as is shown in FIG. 2, packets are sent directly from the ingress path pipeline to the destination output buffer 38. The ingress path processing elements attach an internal header to each packet. This header is used to indicate to the output buffer which handling is required for the packet in order to complete the egress processing. It will be appreciated that conventional methods used during transfer of data can be utilized, e.g., providing redundancy and error checking, light modulation, etc.

However, in order for such architecture to allow sending the packets directly from the ingress buffer 34 to the egress buffer 38, as shown in FIG. 2, the case in which all the N line cards, at a certain point in time, must send packets to the same destination card, must also be accommodated. If the destination card could not absorb all this traffic simultaneously, some of the packets in the ingress would have to be buffered, thus the network could not function without a switch fabric, as used in the conventional network of FIG. 1.

Figure 3:
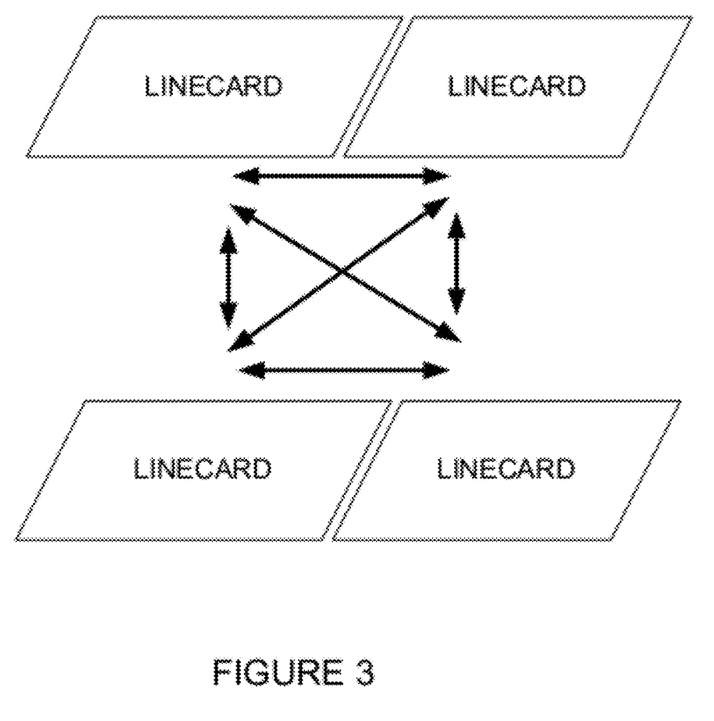
FIG. 3 is a schematic illustration of a fully meshed architecture of a data switching system according to the present invention.

According to the invention, and in order to enable the architecture as shown in FIG. 2, a new Electro-Optical IO interconnect 40, that increases by an order of magnitude the amount of information that can be moved in and out of a regular digital Integrated Circuit (IC), at a very low power, is deployed. This Electro Optical IO 40 is used to connect the processing elements in ingress path pipeline 34 in each line card directly to the egress buffer 38 of every other line card, as is shown in FIG. 3. The Electro-Optical IO provides an amount of bandwidth which is equal to or greater than N times the bandwidth of each line card (hence equal to or greater than a speed up of N), such that all the line cards can send data simultaneously to the same destination line card, if required, and the destination line card, in turn, can absorb all the data simultaneously, due to the electro-optical interfacing.

According to the present invention, implementation of the Electro-Optical IO interconnect 40 in a full mesh connectivity architecture in the switching system eliminates the need for buffering in the ingress and the need for a switch fabric. Creating an electro-optical full mesh connectivity from any line card to any line card, allows for each such destination of the full mesh connectivity to absorb information simultaneously from all the participating receiving line cards. Hence, there is provided full mesh connectivity with a speed up of N at each end of the mesh connectivity.

This results in eliminating the switch fabric, the input queuing and the from-fabric egress buffer from the architecture of the switching system and allows for a smaller, cheaper and less power consuming architecture.

The electro-optical IO interconnect, according to one embodiment, includes a matrix of VCSELs coupled to a first matrix of passive optical elements and a matrix of photo detectors (PDs) disposed in optical communication with the matrix of VCSELs. A second matrix of passive optical elements is coupled to the matrix of PDs. A structure is provided for supporting the matrices to the PD. One example of a suitable electro-optical IO device is described in detail in Applicant's U.S. Pat. No. 7,702,191, granted on Apr. 20, 2010, which is incorporated herein by reference.

Information that must be sent out of the CMOS chip is sent by the CMOS chip logic circuitry to the interface circuitry and from there to the VCSELs. The VCSELs, which are light sources, are modulated by the electric signals from the interface circuitry according to the information to be sent, converting digital signals to analog signals in the electro-optical interconnect coupled to the source line card. Hence, modulated light is sent out from the source.

In a similar way, modulated light that arrives at the photo detectors (PDs) in the electro-optical interconnect coupled to the destination card, is received and turned into an electrical signal by the photo detector and then transferred to the interface circuitry on the CMOS. The interface circuitry amplifies the signal and turns it into a logic electrical signal that is then transferred to the logic circuitry on the CMOS chip, converting analog signals to digital signals in the destination card. A plurality of such CMOS chips with associated VCEL matrices and PD matrices can be connected to implement switching according to the present invention. Alternatively, any other suitable electro-optical IO interconnect structure can be utilized.

Preferably, both the VCSELs and the PDs are arranged in arrays. They are attached, as is described above, to the CMOS on one side and, on the other side, are attached to a bundle that has multiple optical fibers connected to it. Some of those fibers guide the modulated light from the VCSELs to PDs on another CMOS chip that is similarly structured. Likewise, the rest of the fibers guide modulated light from the VCSELs on a remote CMOS chip with a similar structure to the destination PDs. Hence, the arrangement according to the present invention allows optical sending and receiving of information between logic CMOS chips. Since the transmission of information between CMOS chips is performed optically, the amount of bandwidth that can be transferred is much higher, as compared to an all electrical implementation. Furthermore, a much smaller area of the CMOS chip is required to hold connecting elements and much lower power can be utilized for transmission of the same quantity of data.

The set of fibers that are connected to the bundle are arranged such that there is a connection from each sending CMOS chip on each line card, e.g., from ingress path pipeline 34, to a receiving CMOS chip on each of the line cards, such as to egress buffer 38, as illustrated in FIGS. 2 and 3. It will be appreciated that all or several CMOS chips, with the circuitry of the line cards, can be mounted on the same PCB board. Alternatively, they can be mounted on different PCBs. Hence, the full mesh connectivity is provided, as described above, implemented by a mesh of fiber optics going directly between a CMOS chip that performs logical operations on one card to a logical chip performing another or the same logical operation on another line card. Another outcome of this arrangement is that, not only the switch fabric and the associated buffering, as described above, have been deleted, but also the actual back plane can be replaced by direct fibers connectivity.

Figure 4:
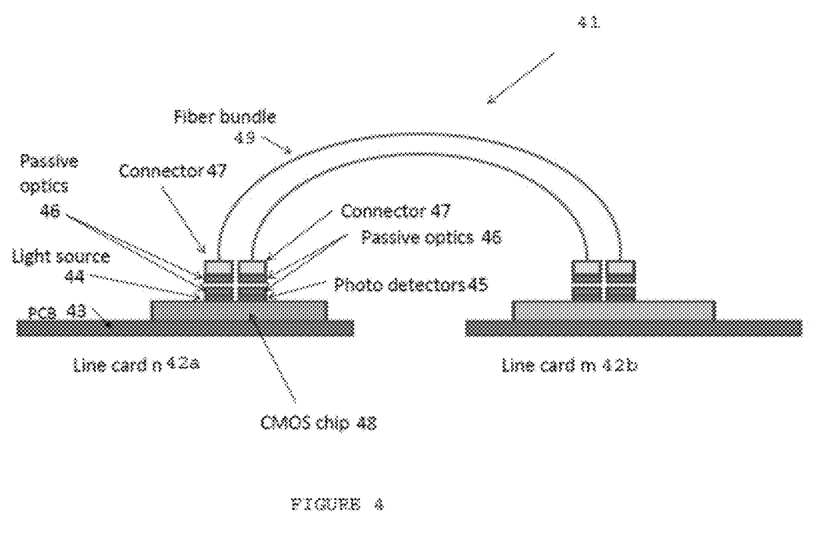
FIG. 4 is a schematic illustration of an exemplary way of coupling two line cards.

FIG. 4 shows an exemplary way of coupling two line cards according to aspects of the present disclosure. Specifically, the structure 41 depicts two line cards 42a and 42b coupled via a fiber bundle 49. Line card n (42a) comprises a PCB 43 and an integrated circuit, for example, a CMOS chip 48, mounted on the PCB. A two way coupling between the two line cards is enabled through a light generating path and a light detecting path on each line card. Light source 44 is coupled to one or more passive optics elements 46 and though the connector 47 can transmit information via the fiber bundle 49 to line card m (42b). Additionally, line card n (42a) has photo detectors coupled to one or more passive optics elements 46 and through the connector 47 can receive information via the fiber bundle 49 from line card m (42b). The light source 44 and photo detectors 45 are also coupled to the CMOS chip 48. FIG. 4 shows two identical line cards, however, it is understood that two different line cards can also be used with the fiber bundle.

The amount of bandwidth each receiving CMOS chip can absorb via an Electro-Optical IO is equal to or greater than the amount each of the sending line cards can send. Further, each such receiving CMOS chip is connected to and receives from all the sending CMOS chips (it is a full mesh, as described) and, hence, it can absorb information from all of them simultaneously. Hence, for a system composed of the same type of line cards, each line card has a speed up of N enabled by the usage of the Electro-Optical IO. It should be noted that for very high speed line cards, the multiplication by N results in a very high number, yielding a requirement for a very high bandwidth into a CMOS chip in order to implement the described architecture. This is impractical to implement using standard electrical IO. Hence, the employment of the Electro-Optical IO interconnect enables using the inventive architecture as described above, which is more efficient, has less hardware and consumes over all less power, for a very high speed switching system.

By applying the electro-optical IO to a standard digital CMOS chip and connecting it in the way that is described above, a novel switching arrangement is provided which is faster, more efficient and has lower power consumption than the traditional router.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

What is claimed is:

1. A packet switching system for a packet transfer network comprising:
   a plurality of line cards, each line card comprising an ingress path pipeline and an egress buffer; and
   an electro-optical In/Out (IO) interconnect coupling the ingress path pipeline of each line card to the egress buffer of the other line cards, wherein said electro-optical IO interconnect includes:
      a CMOS chip with logic circuitry coupled to a matrix of vertical-cavity surface-emitting lasers (VCSELs) and to a matrix of Photo Detectors (PDs), and
      interface circuitry between the logic circuitry on said CMOS chip and said matrix of VCSELs, and between the logic circuitry on said CMOS chip and said PDs;

wherein the ingress path pipeline of each line card is configured to:
i) receive a packet from the packet transfer network,
ii) perform ingress processing on the received packet,
iii) perform partial egress processing on the received packet, including classifying and identifying the egress destination address,
iv) attach data to the received packet identifying any additional egress processing still required for the packet, and
v) send the processed packet to the egress buffer of another line card using the electro-optical IO interconnect.

2. The packet switching system according to claim 1, wherein said electro-optical IO interconnect further includes:
a first matrix of passive optical elements coupled to said matrix of VCSELs; and
a second matrix of passive optical elements coupled to said matrix of PDs;
wherein said PD and VCSEL matrixes are mechanically and thermally isolated from the first and second matrixes of passive optical elements.

3. The packet switching system according to claim 1, wherein said electro-optical IO interconnect includes a congestion-free path from the ingress path pipeline of each line card to the egress buffer of each line card regardless of the type of traffic arriving at the line cards from the packet transfer network.

4. A method of creating a packet switching system for a packet transfer network comprising:
providing a plurality of line cards, each line card comprising an ingress path pipeline and an egress buffer;
coupling the ingress path pipeline of each line card to the egress buffer of the other line cards by an electro-optical In/Out (IO) interconnect, wherein said electro-optical IO interconnect includes:
a CMOS chip with logic circuitry coupled to a matrix of vertical-cavity surface-emitting lasers (VCSELs) and to a matrix of Photo Detectors (PDs), and
interface circuitry between the logic circuitry on said CMOS chip and said matrix of VCSELs, and between the logic circuitry on said CMOS chip and said PDs;
receiving a packet at the ingress path pipeline of a first line card of the plurality of line cards from the packet transfer network;
performing at the ingress path pipeline of the first line card ingress processing and partial egress processing on the received packet, the partial egress processing including classifying and identifying the egress destination address,
attaching data to the received packet identifying any additional egress processing still required for the packet; and
sending the processed packet to the egress buffer of another line card using the electro-optical IO interconnect.

5. The method according to claim 4, further comprising:
coupling a first matrix of passive optical elements to said matrix of VCSELs; and
coupling a second matrix of passive optical elements to said matrix of PDs;
wherein the PD and VCSEL matrixes are mechanically and thermally isolated from the first and second matrixes of passive optical elements.

6. A method of packet switching through a packet switching network comprising:
receiving a packet in an ingress path pipeline in a first line card;
performing ingress processing and partial egress processing on the received packet in said ingress path pipeline, the partial egress processing including classifying and identifying a destination address of said packet;
attaching data to the received packet identifying additional egress processing still required for the packet;
transferring said processed packet to an egress buffer on a second line card via an electro-optical In/Out (IO) interconnect, wherein the electro-optical IO interconnect includes:
a CMOS chip with logic circuitry coupled to a matrix of vertical-cavity surface-emitting lasers (VCSELs) and to a matrix of Photo Detectors (PDs), and
interface circuitry between the logic circuitry on said CMOS chip and said matrix of VCSELs, and between the logic circuitry on said CMOS chip and said PDs; and
performing said additional egress processing in said egress buffer.

7. The method according to claim 6, wherein said step of transferring is performed at a speed up of an integer number.

8. The method according to claim 7, wherein the integer number is equal to a total number of line cards in a packet switching system.

9. The method according to claim 6, wherein said ingress processing includes light modulation.

10. The method according to claim 6, wherein said egress buffer receives packets from a plurality of ingress pipelines simultaneously.

11. The method according to claim 6, wherein said egress buffer is configured to receive packets from all ingress pipelines in a packet switching system simultaneously.

12. The method according to claim 6, further comprising transferring said packet over a permanent congestion-free path through said electro-optical IO interconnect to said egress buffer after said partial egress processing.

* * * * *